United States Patent [19]

Hörmann

[11] Patent Number: 4,819,495
[45] Date of Patent: Apr. 11, 1989

[54] GEAR FOR CONVERTING A ROTARY INTO A TRANSLATIONAL MOTION

[75] Inventor: Michael Hörmann, Steinhagen/Westf., Fed. Rep. of Germany

[73] Assignee: Hörmann KG Antriebs- und Steuerungstechnik, Harsewinkel, Fed. Rep. of Germany

[21] Appl. No.: 8,935

[22] Filed: Jan. 30, 1987

[30] Foreign Application Priority Data

Feb. 1, 1986 [DE]  Fed. Rep. of Germany ....... 3603122
Feb. 1, 1986 [DE]  Fed. Rep. of Germany ....... 3603121

[51] Int. Cl.⁴ ............................................. F16H 1/18
[52] U.S. Cl. .............................. 74/424.6; 74/424.8 A; 49/325
[58] Field of Search ............ 74/424.6, 424.7, 424.8 A, 74/425, 427; 49/325

[56] References Cited

U.S. PATENT DOCUMENTS

| | | | |
|---|---|---|---|
| 2,045,261 | 6/1936 | Clute | 49/325 X |
| 2,131,261 | 9/1938 | Aldeen et al. | 74/424.6 |
| 2,574,657 | 11/1951 | Pierce | 74/424.6 X |
| 2,832,590 | 4/1958 | Youngberg | 74/424.6 X |
| 3,174,742 | 3/1965 | Stelzer | 49/325 X |
| 4,311,225 | 1/1982 | Tsubaki et al. | 192/142 R |
| 4,726,247 | 2/1988 | Hormann | 74/424.6 |

FOREIGN PATENT DOCUMENTS

| | | | |
|---|---|---|---|
| 860111 | 4/1896 | Fed. Rep. of Germany | 74/424.6 |
| 3419477 | 11/1985 | Fed. Rep. of Germany . | |
| 593487 | 2/1925 | France | 49/325 |
| 60-8560 | 1/1985 | Japan | 74/424.6 |

Primary Examiner—Allan D. Herrmann
Assistant Examiner—Janice E. Chartoff
Attorney, Agent, or Firm—Max Fogiel

[57] ABSTRACT

An arrangement for converting rotary motion into translational motion in which a motion-transmission device that is movable translationally, is divided into two strings that move longitudinally along their direction of motion. A driving motor provides rotational motion through a rotary drive. The strings are guided transversely and are positioned outside of a guide where they become separated. The strings, on the other hand, become united inside the guide, and this guide prevents the strings from being movable from each other laterally. The strings have teeth on sides facing each other in vicinity of the guide, and these strings have ends secured to an intermediate component in the guide, remote from the rotary drive. The intermediate component is common to both strings, and they become disengaged in vicinity of the intermediate component.

19 Claims, 2 Drawing Sheets

GEAR FOR CONVERTING A ROTARY INTO A TRANSLATIONAL MOTION

BACKGROUND OF THE INVENTION

A gear of this type is known from German Patent No. 3 419 477, and reference will be expressly made herein to the embodiments specified in that document, without, however, limiting the present scope to them.

The special characteristic of the gear is that the strings, when linked together inside the guide, can transmit considerable tensile and compressive forces without generating much friction against the walls of the guide. Inside the guide the two strings are combined into a single intermediary component, to which the component that is to be shifted, the panel of a door for instance and especially the panel of a garage overhead door or similar structure, is connected.

The main concept behind these gears, which usually have continuous motion-transmission components, chains for example, although they may also involve discontinuous components as in the aforesaid patent, is that the engagement between the rotary drive mechanism and the motion-transmission component is disestablished at no point along the path of motion. Limiting switches are appropriately positioned to determine the back-and-forth motion along its intended path. The edges of the door panel are provided with a safety measure in the form of sensor strips that, when anything gets caught in the panel's path, terminate or reverse its motion. It is desirable to be able to deliver a gear of this type as completely assembled as possible to where it will be used to shorten and simplify the job of installing it on site as much as possible, eliminating in particular the necessity of intervention into the mechanism itself. In particular, if the rotary drive mechanism is engaged with the motion-transmission component when the gear is completely assembled, careless activation of the motor, in the wrong direction for example etc., can lead not only to injury but also to destruction of the parts involved.

Furthermore, many emergency means of preventing the mechanism from exceeding one of its limiting positions have been considered in order to avoid damage to the gear. Thus, an extra limit switch has been provided farther along the path of motion, demanding more expense and an according extension of the path. It is also possible to provide an overload switch that executes a mechanical motion against the force of a spring, whereby the resistance to displacement offered by the spring must be higher than the stress on the gear during normal operation. The electric motor can also be protected from overload by monitoring the electric parameters. In the last two cases, however, it is impossible to prevent the mechanical load exerted on the gear in such a situation from being much higher than in normal operation. This means that the components subjected to stress must be very hefty to eliminate the risk of their being destroyed.

The space required for feeding and introducing the separated strings is an especially important factor in allowing the gear to be delivered as completely assembled as possible even when the demand for space during shipment means that it must be dismantled at least into a drive component and a guide component. The aforementioned patent accordingly discloses not only feeding the strings parallel to the guide but also accommodating each separate string in a drum-type storage unit on each side of the point at which they unite.

In addition to the desirability of minimalizing the friction of the motion-transmission component inside the guide to the greatest extent possible, how easily and with how little friction each separated string can be moved in or out of its stored position is also significant, to keep the power consumption and requisite output of the motor low.

SUMMARY OF THE INVENTION

The object of the present invention is to make available a gear of the aforesaid type that can be delivered as completely assembled as possible and installed on site with no risk of damage due to overloading the mechanism when the motor is turned on for the first time or when at least one of the terminating positions is exceeded during operation.

With a gear having the characteristics recited in the preamble to claim 1 as a point of departure, this object is attained in accordance with the invention by the characteristics recited in the body of that claim.

Although the intermediary component that disestablishes the engagement between the rotary drive and the motion-transmission component in accordance with the invention can be a specific section of the engaged strings, it is in a preferred embodiment one that is designed for both strings together and one that the end of each discontinuous string, the end toward the rotary drive, is secured to. The simplest way of disestablishing the engagement is by means of a drive mechanism positioned without any teeth at the intermediary component and engaged in an idling relationship by the takeoff component of the rotary drive when the intermediary component is in an appropriate delivery-assembly or emergency-displacement position.

The point of departure for normal operation in this case as well is basically the concept of constant operational engagement, and the overall drive mechanism is contrlled with limit switches of conventional design. If the limit switch located at the end of the path of motion toward the rotary drive mechanism fails, the motion-transmission component and hence the intermediary component will travel beyond that terminating position until the drive component of the rotary drive mechanism arrives in the vicinity of the disengagement and automatically disengages the rotary drive mechanism from the motion-transmission component. Considering now the other terminating position of the motion-transmission component, and assuming incorrect travel beyond the limit switch at that point, an excess travel that must be slight maintained can also be provided there, within which the engagement between the rotary drive mechanism and in this case the other end of the motion-transmission component is disestablished, the simplest procedure being to displace the ends of the string that face the intermediary component out over the section where the drive component of the rotary drive mechanism is engaged. With doors, furthermore, it is also possible to activate a safety strip when the closure section has been exceeded, and hence trigger emergency shutoff.

In one especially preferred embodiment of the invention the engagement between the rotary drive mechanism and the motion-transmission component is in the form of a worm that engages a matching worm-engagement thread. The result is an engagement between the thread on the worm, which is part of the rotary drive mechanism, and the worm-engagement thread, which in itself continuously spirals around within the motion-transmission component. Thus, the actual worm-engagement thread does not come into existence until the two strings are united. To make it possible to design the strings as identical as possible, to make them mutually symmetrical that is, each half of the worm-engagement thread in one especially preferred embodiment is provided in one of the sides of the strings, which face each other or engage each other with their teeth when the two strings are united, in such a way that the worm-engagement thread can be considered separated along an axial midplane. The intermediary component has in a practical way a hollow cylindrical space that parallels the direction of travel in the vicinity of the disengagement. The inside dimension of the space is slightly longer than the radial extent of the thread on the worm, which can accordingly rotate freely therein. The design also protect the worm and facilitates reengagement of the worm thread and worm-engagement thread by an appropriate axial displacement.

The position of the motion-transmission component is established in such a way when the gear is assembled that the worm on the rotary drive mechanism or its takeoff component will be very generally located in the vicinity of the disengagement and will accordingly be able to rotate freely within it in relation to the gearing structure on the motion-transmission component. When the gear is installed on site in this state, switching the overall mechanism on carelessly or unintentionally will lead only to free rotation of the rotary drive mechanism, with the motion-transmission component remaining unaffected. At this stage the correct direction of rotation of the rotary drive mechanism is established or initiated and engagement established by appropriately displacing the motion-transmission component away from the rotary drive mechanism.

While one especially preferred embodiment is in the stage of being assembled as completely as possible, a storage-drum unit that is in itself known is mounted on each side of the section where the strings are separated in such a way that both storage drums are provided with a rotary bearing, at least on their floor, on which the stored string is laid down in a spiral.

Making the floor of each storage drum rotating avoids the frictional resistance that occurs in relation to storage in chambers that parallel the guide. If a rotary bearing is considered satisfactory and if the rotation is introduced by applying force against the strings inside the storage unit, it will be preferable to construct a wall along the edge of and projecting above the floor for the sections of string to rest against once they have been introduced. Depending on how much space the storage drums take up when installed, it can also be practical for a terminal section of the wall facing the contact surface to rotate along with the floor.

If the floor of the storage drums is rotated by inserting the string, an outside channeling surface must be provided between the point at which the strings are united and the wall of the drum in order to allow the advance of the string to be as smooth as possible. A conical shaft section is provided especially for this purpose at one end, the end facing the rotor, of the shaft between the motor rotor and the drive worm. The narrow section of the cone is in the vicinity of the worm, and the wide section of the cone is toward the rotor, resulting in a surface that curves toward the axis of the shaft and expands, with a stationary channeling wall in the base aligning with the accordingly expanded shoulder. If the strings are united while being extracted from the storage drums, they will be subjected to tension, causing the strings to rest in channel-shaped recesses against the inside surface of an opposing channeling wall that is also constructed on the base.

The floor in one especially preferred embodiment of the invention is subjected to the force of a spring along the direction of rotation in which the string is coiled within that storage drum and is accordingly increasingly advanced into its stored position. Thus, not only will the strings slide along the channeling sides associated with them as they are extracted out of storage and united into an increasingly longer motion-transmission component, but the same process will be repeated as the strings separate and the motion-transmission component becomes shorter while they are being returned to their particular storage position. Thus the heavy weight of the low-friction channeling structure can be confined to the inside surface of the channeling walls.

The particular spring involved in each process is preferably located on the floor opposite the contact surface. This spring is preferably a helical spring, especially a strip of leaf spring. The spring will preferably be long, extending into the radially outer area of the floor, resulting in a flat characteristic over its total range and keeping the force needed to stress the spring uniformly low, so that the strings extracted from storage to tension the spring will be subject to a slight stress.

Both storage drums in one preferred embodiment are positioned on both sides of the point at which the strings are united—one drum, that is, on each of the two sides—in such a way that their floors are in the same plane, a plane that is more or less in the horizontal position when the equipment is installed. This system saves space and makes it possible to install the base with the motor and already mounted strings and intermediary component separate from the one-part or multiple-part guide rails, dividing up the space in a way that is very practical from the aspect of shipping requirements.

Preferred embodiments of the invention will be evident from the subsidiary claims in conjunction with the examples illustrated in the drawings.

DESCRIPTION OF THE PREFERRED EMBODIMENTS

Figures 1, 2:
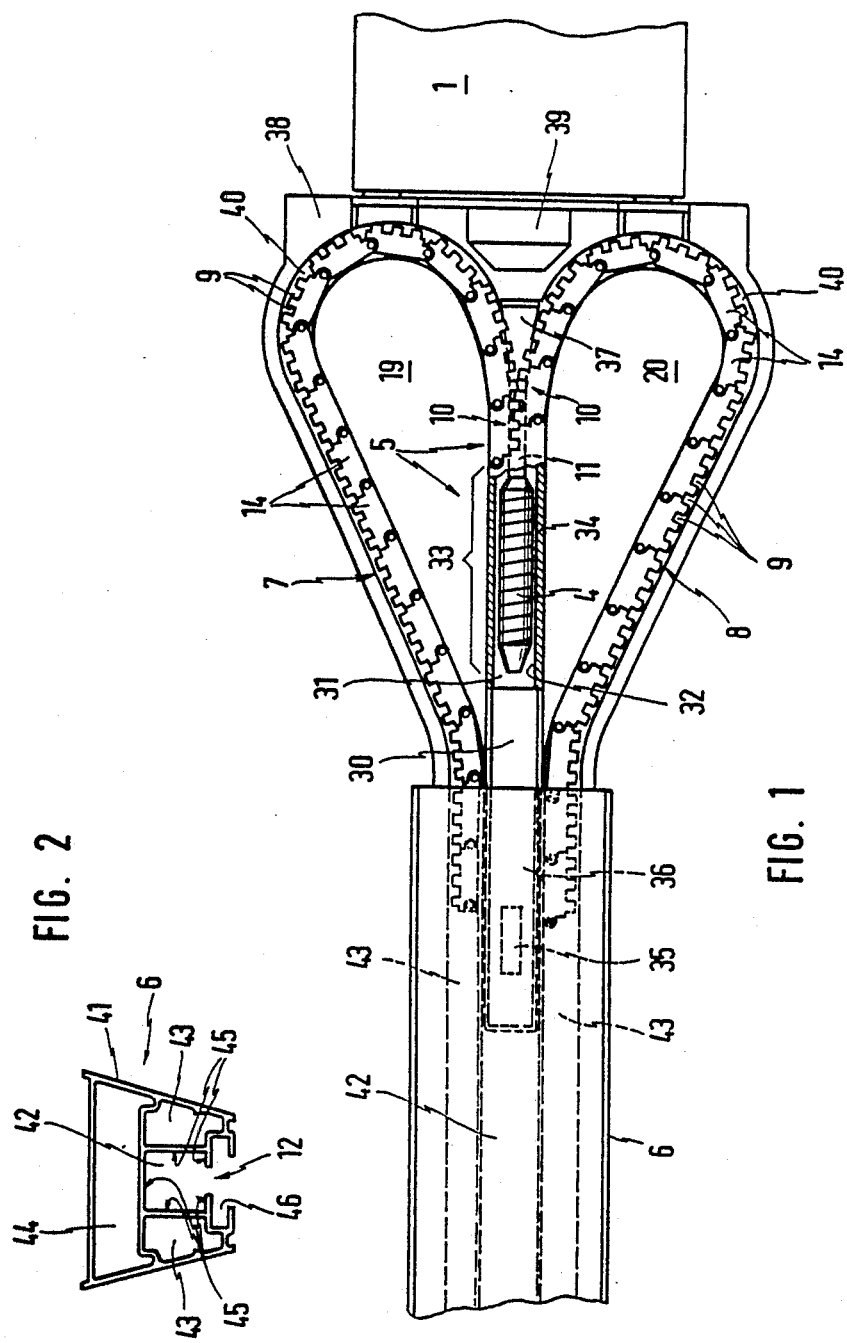
FIG. 1 is a partly broken-open illustration of part of one embodiment with the housing removed.
FIG. 2 is an end view of a strip of structural section that constitutes a guide.

The first embodiment of the gear has a motor 1 with a worm 4 in one piece with and extending out from its shaft in the form of a driveshaft 11. Worm 4 longitudinally engages a motion-transmission component 5 that can travel back and forth in a guide 6 that parallels the shaft. The length of motion-transmission component 5 can be varied by uniting or separating two strings 7 and 8 along a strip of teeth 9. Teeth 9 extend transversely across the strings and are longitudinally interrupted by a worm-engagement thread 10, leaving the teeth distributed along each side of its edge. Since teeth 9 and worm-engagement thread 10 are constructed on the edges of the strings that face each other, when the strings are united the teeth will engage each other and a worm-engagement thread 10 will come into existence half on each side of the combined sides of strings 7 and 8. This situation is illustrated in section in FIG. 2 of German Patent No. 3 419 477.

Both strings 7 and 8 are secured outside guide 6 by means of two deflectors 19 and 20, which help guide the strings, subsequent to their separation and transverse displacement, into storage chambers 43 in guide 6 parallel to motion-transmission component. The ends of strings 7 and 8 that face away from motor 1 extend at the point where they are united into an intermediary component 30 that is common to both strings, that accordingly represents the beginning of motion-transmission component 5 as it comes into existence, that engages a positioning chamber 42 in guide 6, and that can slide back and forth. The section of intermediary component 30 consecutive to the ends of strings 7 and 8 is provided with a space 31 in the shape of a hollow cylinder that extends along the direction of travel, with its inner surface 32 having a longer diameter than that of the mechanism that drives worm 4. Since space 31, furthermore, is longer axially than worm 4 in the same direction, the worm can rotate freely inside it, meaning that it does not engage the worm-engagement thread 10 on strings 7 and 8. Thus the engagement between worm 4 and strings 7 and 8 is disestablished inside space 31, which constitutes the vicinity 33 of the disengagement.

Intermediary component 30 is in the form for instance of a plastic rectangle and has a tubular component 34 that extends from strings 7 and 8 to constitute the vicinity 33 of disengagement. The inner surface 32 of tubular component 34 is the wall of space 31. Tubular component 34 is in an unillustrated way fastened to or in one piece with the walls that extend out from guide 6. Only two such walls are basically necessary. Their faces constitute the remaining surfaces that help establish contact against a positioning partition 45 in positioning chamber 42. As viewed from motor 1 out, an operation-termination section 36 on intermediary component 30 extends from tubular component 34 and is provided with a connector section 35, to which an unillustrated slide that can slide back and forth along guide 6 is secured. The slide is in turn connected to the component that is to be shifted, articulated to the panel of a door for example.

The engagement between the sections is established and disestablished at the section of driveshaft 11 between worm 4 and the rotor of motor 1. To ensure satisfactory positioning of strings 7 and 8 while they are subjected to stress when separated into the storage chambers 43 in guide 6, the stretch of connecting section of driveshaft 11 facing the rotor of motor 1 is provided with a conical shaft section 37 that expands coaxially and conically, and preferably with a surface that curves in toward the axis of the shaft, from the worm end or takeoff end of driveshaft 11 to motor 1. Shaft section 37 extends at that point, either with or without shoulders, into the rotor shaft of motor 1. One of the bearing points of the shaft is in a base 38 and in a convexity 39 provided therein.

Motor 1 is secured to one of the opposing faces of base 38, and guide 6 is secured to the other. Channels 40 are provided in base 38 along the path of transmission between on the one hand the vicinity of unification at the level of driveshaft 11 and on the other the storage chambers 43 for the separated strings 7 and 8, along mutually symmetrical curves, that is—extending from the conically expanded end of shaft section 37, through curved wall structures on the face and, toward storage chambers 43, through straight sections into a terminal section, where they are bent down to create the outside walls of channels 40, whereas the inside walls are created by deflectors 19 and 20. In practical terms, one channel 40 is created in base 38 for each section 7 and 8, resulting in one deflector 19 and 20 at the inside of the curve in each channel, whereas the opposite channel walls consist of the outside sections of the base.

The strings in the illustrated embodiment consist of a number of consecutive strip sections 14 distributed along the direction of the string, articulated to one another, and with the teeth and the halves of worm-engagement thread 10 provided on them. Although this design corresponds to that of the embodiment illustrated in FIG. 3 of German Patent No. 3 419 477, strings 7 and 8 can also be designed like the other embodiments disclosed therein or even otherwise, in the form of a toothed belt for example.

FIG. 2 illustrates a cross-section or face-on view of a structural-section rail 41 that constitutes guide 6. Between the walls of rail 41 is an upper communicating chamber 44 that can accommodate the components that secure rail 41 to base 38 or consecutive sections of rail to one another longitudinally. At the longitudinal midsection of rail 41 and below communicating chamber 44 is positioning chamber 42, which accommodates both intermediary component 30 and the consecutive motion-transmission component 5 that is created out of the united strings 7 and 8 as they enter guide 6. Positioning chamber 42 communicates through a longitudinal slot 12 in its bottom surface with a slide-positioning space 46 in which an unillustrated slide that is connected to intermediary component 30 slides back and forth. Thus, the positioning partition 45 inside positioning chamber 42 is interrupted only by slot 12. Storage chambers 43 are positioned below communicating chamber 44 and on each side of positioning chamber 42. The cross-section of storage chambers 43 is completely enclosed.

FIG. 1 represents the displacement of intermediary component 30 and hence of strings 7 and 8 during which engagement 4 and 10 is disestablished by the presence of worm 4 in the disengagement vicinity 33 of intermediary component 30 or of its space 31. At this stage of displacement the gear has preferably been delivered on site already assembled. The engagement between the thread on worm 4 and the worm-engagement thread 10 on strings 7 and 8 can easily be established by intervening in the slot outside of the unillustrated slide and accessible from below and accordingly, without having to remove the unillustrated housing of base 38, attaining access to intermediary component 30 from outside and sliding it away from motor 1. With the motor rotor turning in the correct direction, then, the thread on worm 4 will rotate into the worm-engagement thread 10 on strings 7 and 8 so that, as rotation continues in that direction, an advance in the direction away from the motor will be exerted by worm 4 against the united strings 7 and 8 and hence against intermediary component 30. With worm 4 rotating in the opposite direction, the motion-transmission component created out of the united strings 7 and 8 and intermediary component 30 will be continuously extracted from guide 6 and toward motor 1, with strings 7 and 8 separating, guided by conical shaft section 37 and the subsequent outer walls of channels 40. A limit switch is employed to ensure that during properly functioning operation the engagement between worm 4 and the united strings 7 and 8 will remain in that terminating position when the mechanism is turned off, with intermediary component 30 still inserted in guide 6 as illustrated in FIG. 1. Thus, FIG. 1 represents the stage of displacement attained when the mechanism has advanced too far, beyond the limit switch, establishing automatic uncoupling between motor 1 and motion-transmission component 5, as intentionally adjusted when the assembled gear is delivered.

Figure 3:
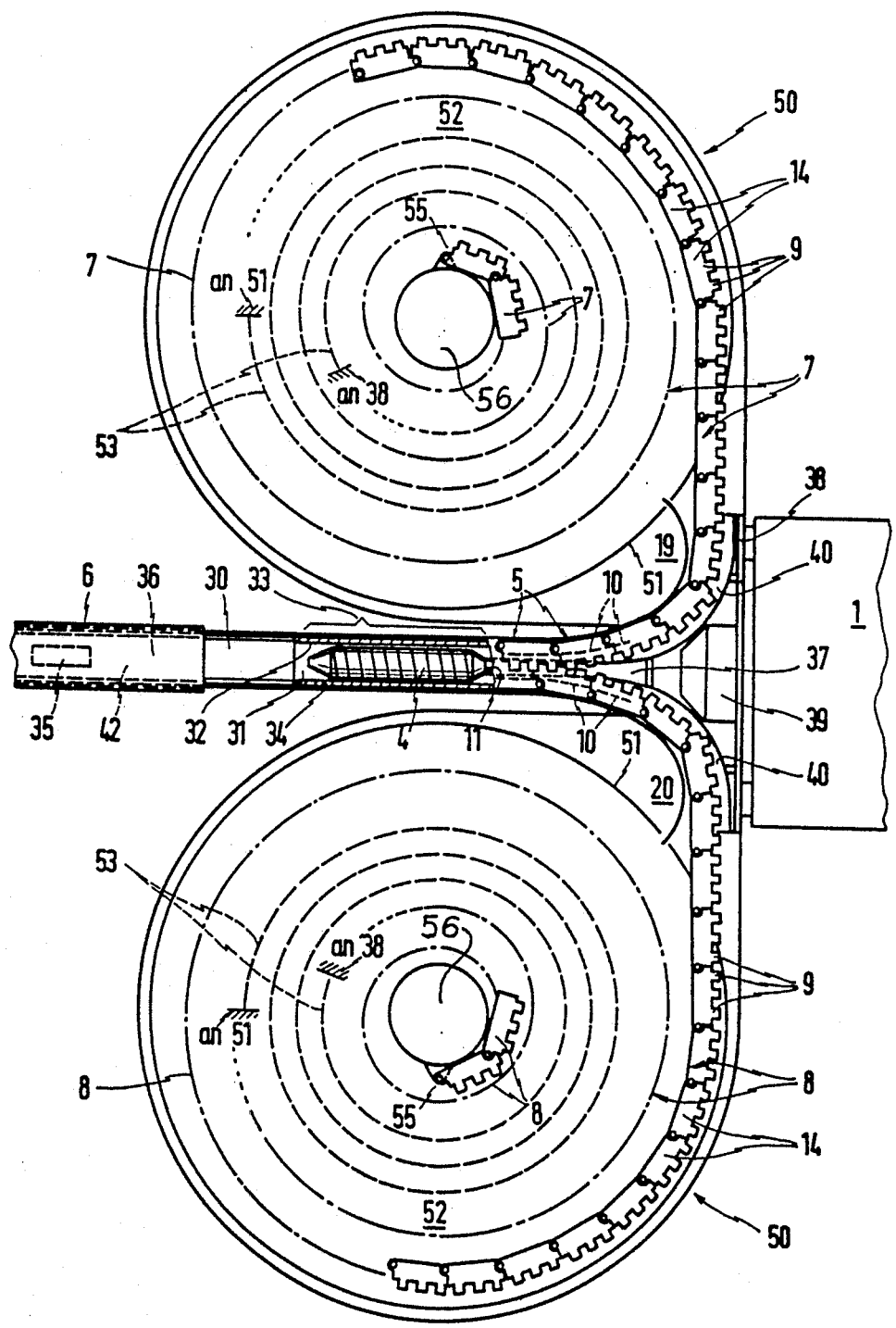
FIG. 3 is a partly broken-open illustration of part of another embodiment with the housing removed.

The second embodiment of the gear, illustrated in FIG. 3, operates with a motor 1, a worm 4, a motion-transmission component 5, a guide 6, and two strings 7 and 8 that are united therein, with teeth 9 located in the sides of the strings that face each other when the strings are united and with a worm-engagement thread 10 created between them as previously described herein in relation to the previous embodiment.

Both strings 7 and 8 are secured outside guide 6 by two deflectors 19 and 20 which help guide the strings, subsequent to their separation and transverse displacement, into storage drums 50 positioned on each side of where they are united, the vicinity of worm 4 and upstream, that is. Channels 40 are provided in the base along the path of transmission between on the one hand the vicinity of unification at the level of driveshaft 11 and on the other the storage drums 50 for the separated strings 7 and 8, along mutually symmetrical curves, that is—extending from the conically expanded end of shaft section 37 and through curved wall structures on the face into the space above floors 51 into storage drums 50.

Each floor 51 is a circular disk with a rotating mount 56 of any desired design in the center. The floors 51 of storage drums 50 extend in a common plane that is approximately horizontal when the gear is installed on site, with the axes of rotation accordingly extending more or less vertically. The surfaces of floors 51 that face the observer are in the form of contact surfaces 52, which the longitudinal sections of strings 7 and 8 that have been transferred into the drums rest against. Thus, as soon as the storage end of string 7 has arrived at the associated floor, it will be supplied to it along the direction of rotation almost without motion. If the rotation of floor 51, which will then preferably be provided with an edge that extends laterally up beyond the periphery of contact surface 52, is initiated by the advance of the string being introduced into its stored position, the advancing strings will slide along the particular outside wall of the channels, which is why driveshaft 11 is provided with a conical section 37. When the strings are extracted out of storage in the other direction on the other hand, they will rest subject to tension against the inner guide walls of the particular channel 40.

The drawing illustrates an embodiment in which each floor 51 is subject to the force of a spring 53, specifically in such a way that the spring will tend to move the floor in the direction in which the particular string is being accommodated in a storage drum 50 around the axis of rotation. The result is that strings 7 and 8 will be forced to slide along the inside guide wall of the particular channel 40 even during the storage motion. Thus, there will always be a slight tension on strings 7 and 8 in both directions, so that the outside walls of channels 40 and conical shaft section 37 primarily represent preventive measures and only accommodate and guide the strings when they, due to interference with the rotational storage process or due to a broken spring, must be advanced into their stored position.

The particular spring 53 associated with each floor 51 is positioned on the bottom surface of the floor, the surface facing contact surface 52 and hence away from the viewer, and is represented by the broken lines in the drawing in the form of a spiral spring that, as illustrated, preferably extends along a radially outward area and is long enough to generate a flat force-to-path characteristic along the unwinding-rotation area of the floor, so that only a slight spring force is exerted on the particular floor and the tension on the strings and hence the force with which they are driven against the guide surfaces remain low.

It will obviously be unnecessary in this case to provide the rotating floors 51 with an edge to accommodate the sections. The spiral springs, which are preferably strips of leaf spring, can be secured with the inner end of the spiral against base 38 and the outer end against the floor or vice versa.

Guide 6 is preferably in the form of a rail made out of structural section with a positioning chamber 42 that has an unillustrated longitudinal slot along its bottom surface, through which the connector section 35 of intermediary component 30 communicates in an unillustrated way with the slide or directly with the component that is to be moved, particularly the panel of a door, the panel of a garage overhead moving door for example.

I claim:

1. An arrangement for converting rotary motion into translational motion, comprising: driving motor means; rotary drive means connected to said motor means; motion-transmission means moveable translationally and divided longitudinally along a direction of motion into tow strings; guide means for guiding said strings transversely, said strings being positioned outside said guide means at one end and separated from each other, said strings being united at the other end inside said guide means, said guide means preventing the united end of the strings from being laterally removable from each other; engagement means for connecting said strings to said rotary drive means where they are united, said strings having teeth on sides facing each other in vicinity of said guide means, said strings engaging each other by said teeth; an intermediate component in said guide means remote from said rotary drive means, said strings having ends secured to said intermediate component, said intermediate component being common to both strings; said strings being disengaged from said engagement means in vicinity of said intermediate component; a worm extending along said guide means and engaging a worm-engagement thread on facing sides of said strings in vicinity of said guide means and adjacent to a section of said strings carrying said teeth, said worm connecting said strings to said rotary drive means at a location where said strings are united, said teeth extending substantially perpendicular to a longitudinal axis of said guide means, said worm-engagement thread being divided into two halves by an axial midplane, said strings being connected to said intermediate component.

2. An arrangement as defined in claim 1, wherein said guide means has a slot therein and along said guide means, said intermediate component having a connector section oriented toward said slot.

3. An arrangement as defined in claim 2, wherein said connector section comprises a bore positioned in a terminating section of said intermediate component.

4. An arrangement as defined in claim 1, including a storage drum for each string adjacent to a point of separation of said strings for storing said strings separated outside said guide means, said storage drum having at least a rotating base for depositing stored string in a spiral on said base.

5. An arrangement as defined in claim 4, including spring means tensioning said base along a direction of winding of said string, said spring means being mounted on a bottom surface of said base.

6. An arrangement as defined in claim 4, wherein said string has an end opening into said storage drum and being secured to said base.

7. An arrangement as defined in claim 4, wherein rotating bases of said storage drums on each side of the united section of said strings extend in a horizontal common plane when said arrangement is in an operational state.

8. An arrangement as defined in claim 5, wherein said spring means spirals along a bottom surface of said base.

9. An arrangement as defined in claim 8, wherein said spring means comprises a flat strip member.

10. An arrangement as defined in claim 8, wherein said spring means has a spirally outward end secured to said base, said spring means having a spirally inward end secured to a base-shaped supporting member.

11. An arrangement as defined in claim 1, including a storage drum for each of said strings adjacent to the location of separation of said strings, said strings being separated outside said guide means, each storage drum having at least a rotating base for depositing stored string in a spiral on the base; spring means tensioning said base along a direction corresponding to the winding of said string, said spring means being mounted on a bottom surface of said base.

12. An arrangement for converting rotary motion into translational motion, comprising: driving motor means; rotary drive means connected to said motor means; motion-transmission means moveable translationally and divided logitudinally along a direction of motion into two strings; guide means for guiding said strings transversely, said strings being positioned outside said guide means at one end and separated from each other, said strings being united at the other end inside said guide means, said guide means preventing the united end of the strings from being laterally removable from each other; engagement means for connecting said strings to said rotary drive means where they are united, said strings having teeth on sides facing each other in vicinity of said guide means, said strings engaging each other by said teeth; an intermediate component in said guide means remote from said rotary drive means, said strings having ends secured to said intermediate component, said intermediate component being common to both strings; said strings being disengaged from said engagement means in vicinity of said intermediate component; a worm extending along said guide means and engaging a worm-engagement thread on facing sides of said strings in vicinity of said guide means and adjacent to a section of said strings carrying said teeth, said worm connecting said strings to said rotary drive means at a location where said strings are united, said teeth extending substantially perpendicular to a longitudinal axis of said guide means, said worm-engagement thread being divided into two halves by an axial midplane, said strings being connected to said intermediate component, said intermediate component having a hollow space inside said component and extending along said guide means, said hollow space being axially longer than the thread on said worm.

13. An arrangement as defined in claim 12, wherein said hollow space extends coaxial with worm-engagement thread on said strings, said hollow space extending also coaxial with said worm, said hollow space surrounding with play a radially outer demarcation of the thread on said worm in vicinity of disengagement of said strings from said engagement means.

14. An arrangement as defined in claim 13, wherein said intermediate component remains within said guide means at every stage of displacement of said motion-transmission means, said intermediate component having walls along said guide means; and a tubular member surrounding said worm.

15. An arrangement as defined in claim 12, including a shaft between said motor means and said worm and having a conical shaft seotion between said motor means and said worm, said conical section having a surface curving along an axis of a cone, said cone having a surface functioning as a guide for said strings as said strings separate.

16. An arrangement as defined in claim 15, wherein said guide comprises a multi-chambered hollow structural-section rail.

17. An arrangement as defined in claim 16, wherein said intermediate component is accommodated in a positioning chamber, said positioning chamber having two storage chambers on sides of said positioning chamber for each of said strings when separated.

18. An arrangement as defined in claim 17, wherein said driving motor means has components in a communicating chamber above said positioning chamber.

19. An arrangement for converting rotary motion into translational motion, comprising: driving motor means; rotary drive means connected to said motor means; motion-transmission means moveable translationally and divided longitudinally along a direction of motion into two strings; guide means for guiding said strings transversely, said strings being positioned outside said guide means at one end separated from each other, said strings being united at the other end inside said guide means, said guide means preventing the united end of the strings from being laterally removable from each other; engagement means for connecting said strings to said rotary drive means where they are united, said strings having teeth on sides facing each other in vicinity of said guide means, said strings engaging each other by said teeth; an intermediate component in said guide means remote from said rotary drive means, said strings having ends secured to said intermediate component, said intermediate component being common to both strings; said strings being disengaged from said engagement means in vicinity of said intermediate component; a worm extending along said guide means and engaging a worm-engagement thread on facing sides of said strings in vicinity of said guide means and adjacent to a section of said strings carrying said teeth, said worm connecting said strings to said rotary drive means at a location where said strings are united, said teeth extending substantially perpendicular to a longitudinal axis of said guide means, said worm-engagement thread being divided into two halves by an axial midplane, said strings being connected to said intermediate component, said intermediate component having a hollow space inside said component and extending along said guide means, said hollow space being axially longer than the thread of said worm; said intermediate component having a cylindrical hollow space extending coaxial with a worm-engagement thread on said strings and extending also coaxial with said worm, said cylindrical hollow space surrounding with play radially an outer demarcation of the thread on said worm in vicinity of disengagement of said strings from said engagement means; said intermediate component remaining inside said guide means at every stage of displacement of said motion-transmission means, said intermediate component having walls along said guide means; and a tubular member secured against said walls; said guide means having a slot therein and along said guide means, said intermediate component having a connector section oriented toward said slot.

* * * * *